Aug. 13, 1963　　　　J. G. PADELT　　　　3,100,428
KNOB FOR SETTING DIAPHRAGM APERTURE ON CAMERA
EQUIPPED WITH EXPOSURE METER
Filed Nov. 14, 1960　　　　　　　　　　3 Sheets-Sheet 1

INVENTOR.
JOHANNES G. PADELT
BY
*B. Schlesinger*
Attorney

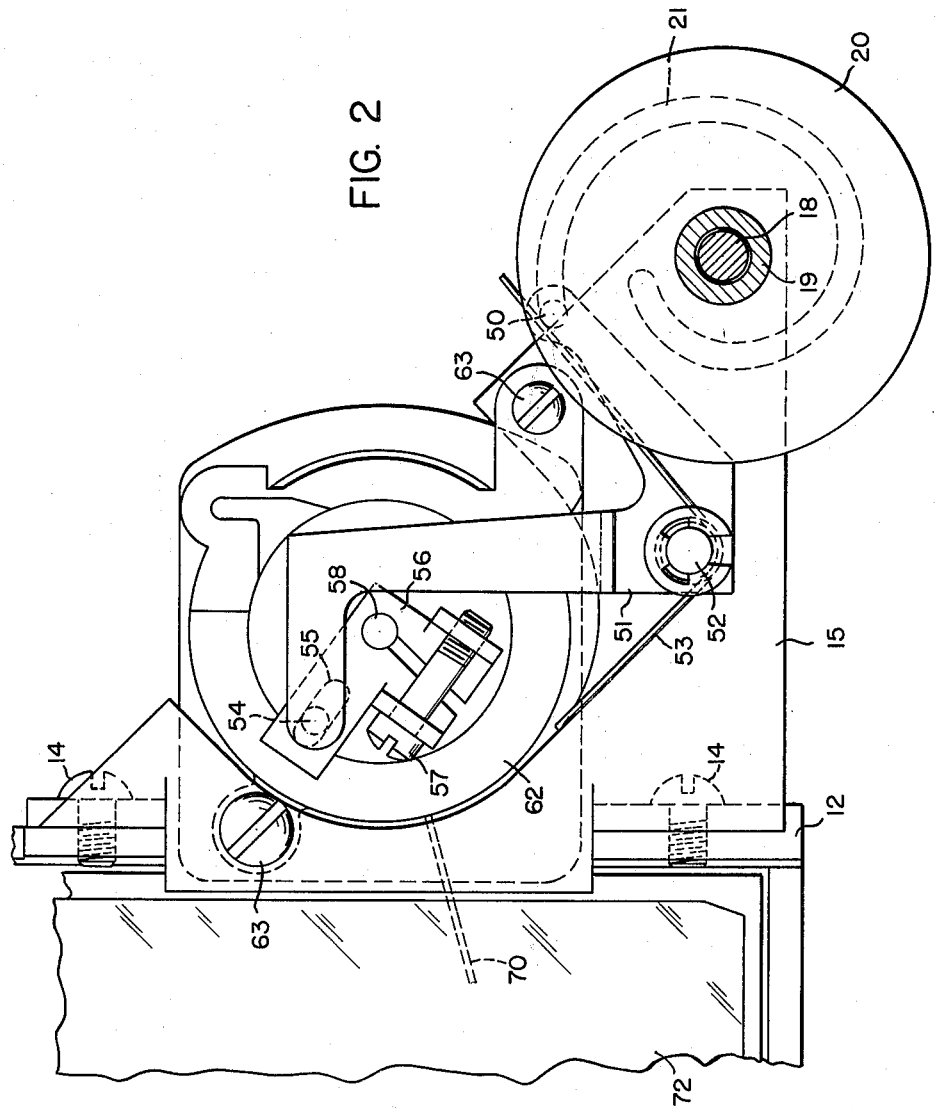

Aug. 13, 1963    J. G. PADELT    3,100,428
KNOB FOR SETTING DIAPHRAGM APERTURE ON CAMERA
EQUIPPED WITH EXPOSURE METER
Filed Nov. 14, 1960    3 Sheets-Sheet 3
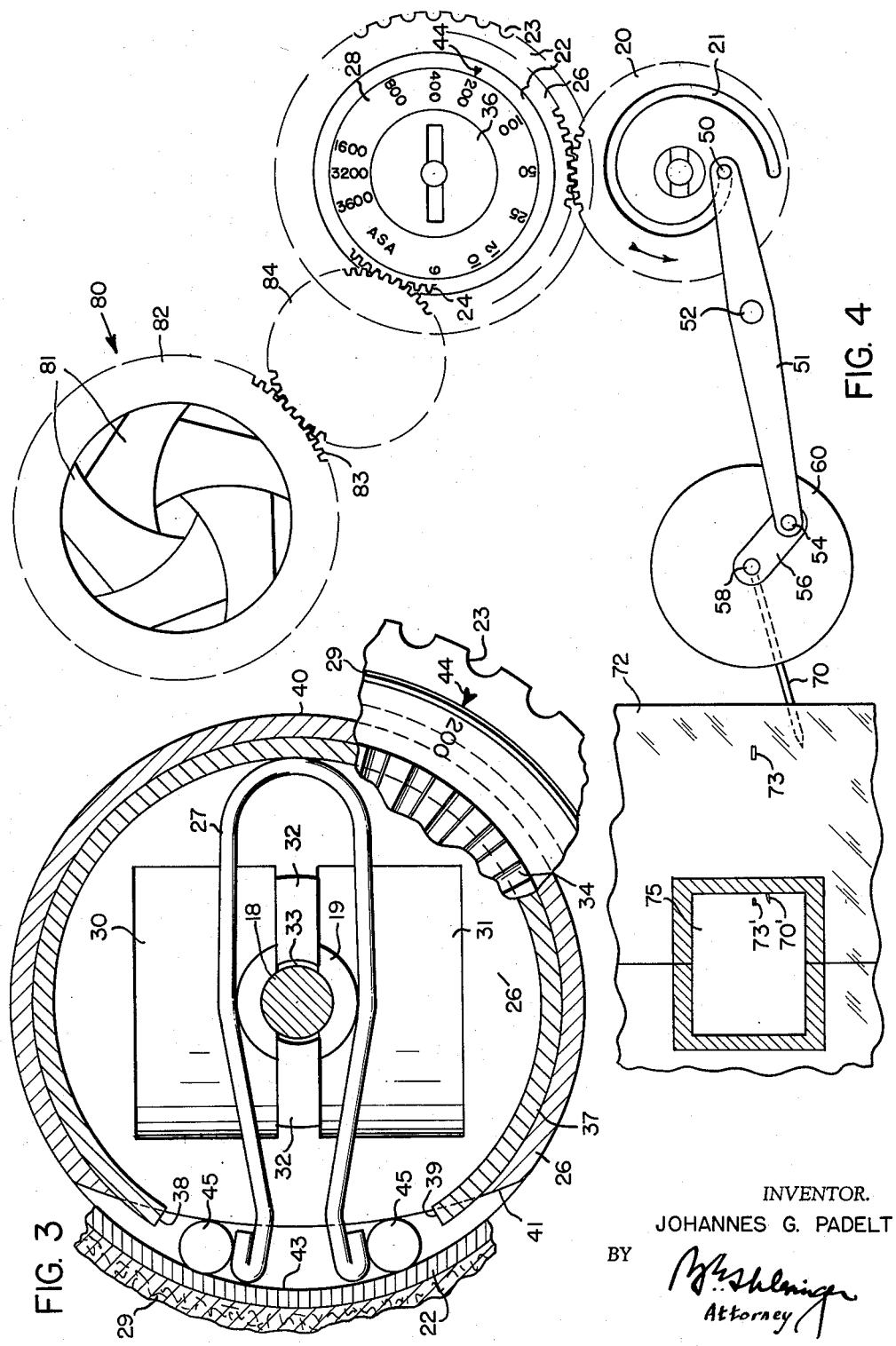
INVENTOR.
JOHANNES G. PADELT
BY
Attorney

United States Patent Office 3,100,428
Patented Aug. 13, 1963

3,100,428
KNOB FOR SETTING DIAPHRAGM APERTURE ON CAMERA EQUIPPED WITH EXPOSURE METER
Johannes G. Padelt, Rochester, N.Y., assignor to Graflex, Inc., Rochester, N.Y., a corporation of Delaware
Filed Nov. 14, 1960, Ser. No. 69,071
9 Claims. (Cl. 95—10)

The present invention relates to photographic cameras, and more particularly to photographic cameras having a built-in exposure meter for controlling the exposure aperture or diaphragm opening. More specifically, the invention relates to a camera having a built-in exposure meter, where the exposure meter is used in manually setting the diaphragm aperture by adjusting the diaphragm to match the position of the needle of the exposure meter.

For top-quality photography, consideration should always be given to the film speed when taking pictures. Different types of film have different speeds and are given different standard ASA ratings. For proper control of the diaphragm aperture, therefore, in a camera, which is equipped with a built-in exposure meter, means should be provided for adjusting the diaphragm aperture relative to the exposure meter, when changing film from film of one speed to film of another speed, thereby to compensate for the film speed of the film to be used.

The primary object of the present invention is to provide manually operable means which can be located conveniently on a camera, for adjusting the diaphragm aperture relative to the exposure meter of the camera to compensate for change in speed of the type of film used in the camera.

Another object of the invention is to provide manually adjustable mechanism of the character described which will be simple in construction, relatively inexpensive, and which will permit readily and easily adjusting the diaphragm opening for different ASA film ratings.

Other objects of the invention will be apparent hereinafter from the specification and from the recital of the appended claims, particularly when read in conjunction with the accompanying drawings.

In the drawings:

FIG. 2 is a section on the line 2—2 of FIG. 1 looking in the direction of the arrows;

FIG. 3 is a fragmentary section on the line 3—3 of FIG. 1 looking in the direction of the arrows; and FIG. 4 is a diagrammatic view illustrating the operation of the apparatus of this invention.

Figure 1:
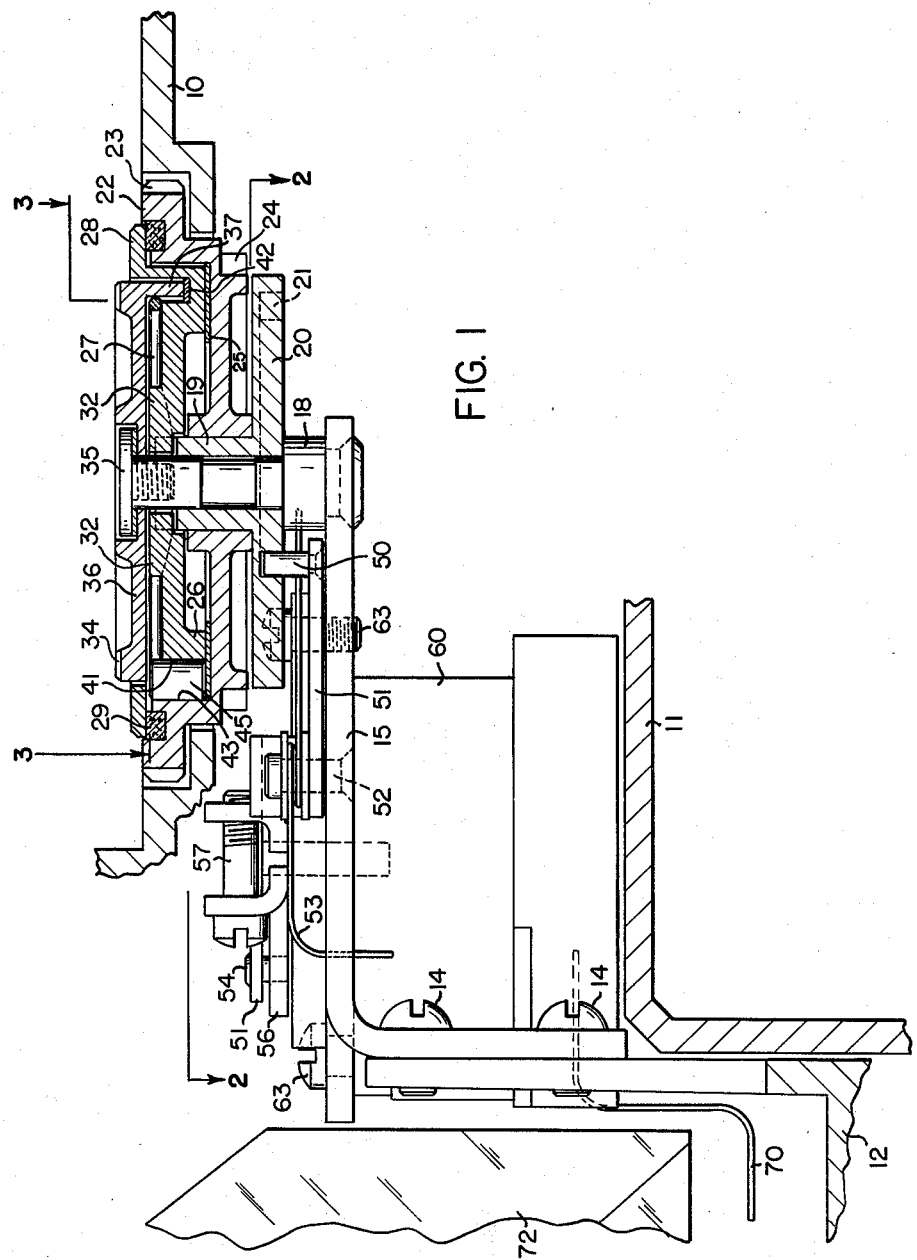
FIG. 1 is a fragmentary sectional view of a camera having a built-in exposure meter and equipped with apparatus constructed according to one embodiment of this invention for manually adjusting the diaphragm aperture relative to the exposure meter to compensate for the film speed of the film which is to be used in the camera.

Referring now to the drawings by numerals of reference, 10 (FIG. 1) denotes the top cover of a camera; 11 designates the camera body; and 12 the camera chassis. Mounted on the chassis 12 by means of screws 14 is a right angular shaped bracket 15. Riveted to the projecting end of this bracket is a post 18. Journaled on the post 18 is a cam 20 whose hub portion 19 surrounds the post. The cam is a face cam and is provided on its bottom side face with a spiral cam groove 21. Rotatably mounted around the hub portion 19 of the cam 20 is a setting knob 22. This knob is knurled, as denoted at 23, around the upper portion of its periphery. It is formed around the lower part of its periphery with spur gear teeth 24. The upper face of the knob 22 is recessed to receive a washer 25 and a rotary clutch member 26. The clutch member 26 seats on washer 25 and is recessed on its upper face to receive a generally U-shaped spring 27. The clutch member 26 has a marginal flange portion 28 at its upper end which rides on a plush or felt annular gasket 29 that seats in an annular groove in the upper face of the setting knob 22. The upper face of the clutch member 26 is milled out at opposite sides of its axis, as denoted at 30 and 31 in FIG. 3, to provide upwardly projecting key portions 32 by means of which the clutch member 26 is keyed to cam 20. The key portions 32 project radially inwardly and engage in notches 33 formed in the upper end of the hub 19 of cam 20.

Secured to the upper end of the post 18 as by means of a screw 35 is a clutch release disc 36. This disc is knurled on its upper face around its marginal edge as denoted at 34; and it has an arcuate, marginal, depending rim 37 which engages in a correspondingly-shaped arcuate groove in the clutch member 26. Opposite ends of the arcuate rim 37, which are denoted at 38 and 39, respectively, in FIG. 3, are spaced angularly from one another.

The clutch member 26 has a peripheral surface 40 which is cylindrical for the greater part of its extent, but which is formed around a portion thereof with an arcuate cam surface 41. Disposed between the cam surface 41 of the member 26 and the confronting internal surface 43 of the setting knob 22 are two cylindrical rollers 45, which are constantly urged apart by the downturned, free ends of a U-shaped spring 27. The spring 27 is disposed in the upper recessed portion of the disc 26 above its milled-out portions 30 and 31. It straddles the hub portion 19 of cam 20. Its bight portion seats against the inside wall of rim 37 of release disc 36; and its free ends are disposed in the space between cam surface 41 of disc 26 and the opposed surface 43 of setting knob 22. The free ends of the spring tend constantly to urge the rollers 45 apart to wedge them between the surface 43 of the setting knob 22 and the opposed surface 41 of the clutch member 26, thereby frictionally coupling the member 26 to the setting knob 22.

Engraved on the upper face of the flange 28 of the clutch member 26 is an ASA scale graduated for film speed. Engraved on the upper face of the setting knob 22 is an index point 44 which reads against this scale. By holding the setting knob 22 in place and turning the release member 36, or vice versa, one end 38 or 39 of the rim 37 of the release member 36, depending upon the direction of rotation, will force one of the rollers 45 out of its locking position against the resistance of spring 27, and, operating through that roller and the spring, will cause the clutch member 26 to be turned, thus changing the position of the index point on the setting knob 22 relative to the ASA scale on the clutch member 26.

By releasing the coupling, then, the positions of the index point and the ASA scale relative to each other can be changed in conformity with the film speed of the film in the camera. Since the two rollers 45 work in opposite directions, the release knob 36 can be turned in either direction to line up any ASA graduation with the index point. The coupling of the clutch member 26 to the setting knob 22 will be effected automatically under action of the spring 27, as soon as the release knob 36 is released.

A pin or follower 50 rides in the cam groove 21 of the cam 20. This pin or follower is carried by a bell crank lever 51 which is pivoted intermediate its ends by means of a pin 52 on the bracket 15. At its opposite end, the bell crank carries a pin 54 which engages in a slot 55 in a split clamp member 56 that is secured by a bolt 57 around and to a stud 58 which is fastened rigidly to the housing of an exposure meter 60 that is mounted within the camera. A coil spring 53, which is wound around pin 52, and which bears at one end against pin 50 and at its opposite end against the housing of the exposure meter, serves to maintain the pin 50 in engagement with one side of the cam slot 21, and to take up any backlash between the pin and the cam slot.

The exposure meter may be of conventional construction, containing a photoelectric cell and a galvanometer operated by that cell, and may be mounted in the camera by means of the end plate 62 and the screws 63 which fasten the end plate to the bracket 15. Secured to the galvanometer shaft at the end opposite where clamp 56 is secured to the galvanometer housing is a pointer 70. The pointer 70 is positioned to be viewed through a prism 72 forming part of the viewfinder system of the camera. In the camera illustrated, the prism 72, or a viewing screen behind the prism, has an index mark on it as denoted at 73 (FIG. 4); and the pointer 70 moves in front of the prism so that the image of the index mark 73 will be seen in the viewfinder 75 of the camera at 73' and the pointer will be seen also as denoted, for instance, at 70'.

The mechanism is illustrated diagrammatically in FIG. 4, where some liberties have been taken in order to show the mechanism in one plane. Here the diaphragm, whose aperture is to be regulated, is denoted at 80, and its leaves are designated at 81. The diaphragm setting ring, which operates the diaphragm leaves to open or close down the diaphragm aperture, depending upon the rotation of the ring 82, is shown as geared, by gear teeth 83 on the ring, an idler gear 84, which meshes with teeth 83, and the gear teeth 24, to the setting knob 22 which, as stated, has its upper face 28 graduated for the ASA film speeds. In the actual construction, the coupling member 26 is keyed to the cam 20. For the purposes of the diagrammatic illustration in FIG. 4, however, the member 26 is shown as geared to the cam 20.

In operation, as light conditions change, the galvanometer coil will move pointer or needle 70 in one direction or the other, depending upon prevailing light conditions. The photographer will adjust the diaphragm aperture to match the pointer. This he does by turning setting knob 22 until the galvanometer needle 70 registers with the index mark 73 on the viewing screen as seen at 73' through the viewfinder. Rotation of the setting knob 22 causes the exposure meter 60 to be rotated and simultaneously causes the diaphragm ring 82 which sets the diaphragm aperture, to be rotated in proper proportion. The exposure meter is rotated, upon rotation of the setting knob 22, through keys 32 (FIG. 3), slots 33 in hub 19 of cam 20, pin 50 which engages in cam slot 21, lever 51, pin 54 (FIG. 2), slot 55, split clamp 56 and stud 58. The diaphragm ring 82 (FIG. 4) is rotated, upon rotation of setting knob 22, through gear 24, idler 84, and gear teeth 83. The ring 82 is connected in conventional manner through a differential (not shown) to the shutter speed stting ring of the camera so that at both ends of the movement of the diaphragm ring 82, the shutter speed can be set. Thus, the setting knob can be used to set both diaphragm aperture and shutter speed.

When a change in type of film, which is used in the camera, is made, the position of the setting ring 82 relative to the exposure meter setting is changed to compensate for the change in speed of the new film. For this purpose, the release member 36 is rotated while holding the setting knob 22, or vice versa, the setting knob 22 is rotated while holding the release member 36. The end 38 or 39 of the rim 37 of the release member 36 will thereupon force one of the rollers 45 out of its locked position, and part 36 and coupling member 26 will then be turned together until the graduation on the ASA scale, which indicates the ASA speed rating of the new film, registers against the index mark 44 on the knob 22. Thereby the coupling member 26 will be rotated to rotate the cam 20, which through lever 51, link 56 and stud 58 will rotate the galvanometer and its needle 70 to proper zero position to conform to the new setting of the ASA scale relative to the index on the knob 22. During this adjustment, setting knob 22, gear 24, and diaphragm ring 82 will remain stationary since diaphragm setting knob 22 is uncoupled from coupling member 26. Thus, the rotary position of the exposure meter will be changed relative to the diaphragm aperture to conform to the film speed of the film to be used in the camera.

As soon as the release knob 36 is released, though, the spring 27 will force the rollers 45 back into coupling position to again couple cam 20 to the exposure knob 22 through coupling member 26 and rollers 45, thereby coupling the diaphragm to the exposure meter again so that the diaphragm aperture will again be adjusted with the exposure meter when the knob 22 is adjusted to rotate the galvanometer until its pointer 70 reads at zero against the zero mark 73 on the viewing screen, as viewed through the viewfinder 75. Hence, thereafter, as the prevailing light conditions cause the galvanometer needle 70 to move in one direction or the other from the zero position, there will be compensation for the film speed in the adjustment of the diaphragm aperture.

I have, therefore, provided a simple, compact, convenient mechanism for adjusting the diaphragm aperture relative to the exposure meter to compensate for any change in speed of the film being used in the camera. Since the two rollers 45 operate in opposite directions, turning of release knob 36 can be effected in either direction to line up any ASA number with index point 44. The track 21 of cam 20 can be made to any suitable curvature to compensate for the relative turning motions of galvanometer 60 and diaphragm ring 82, this depending, of course, upon the gear ratio between them. The outstanding feature of the apparatus disclosed is the ease of changing for different ASA ratings by just holding one member of a coupling in place while turning the other to the ASA number of the film used. The coupling will uncouple and couple automatically.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. In a camera having an exposure meter and a diaphragm, said exposure meter including a rotatable galvanometer and a pointer for indicating the galvanometer reading, a manually-rotatable setting knob, means connecting said knob with the diaphragm to adjust the diaphragm aperture upon rotation of said knob, means for rotating said galvanometer to bring the pointer into a predetermined position, means coupling the last-named means with said knob to rotate said galvanometer upon rotation of said knob, and means for disconnecting said coupling means to permit said last-named means to be actuated independently of said knob to change the relative positions of the exposure meter and said knob to compensate for change in speed of the photosensitive medium used in the camera.

2. In a camera having an exposure meter and a diaphragm, said exposure meter including a rotatable galvanometer and a pointer for indicating the galvanometer reading, a manually-rotatable setting knob, means connecting said knob with the diaphragm to adjust the diaphragm aperture upon rotation of said knob, means for rotating said galvanometer to bring said pointer into a predetermined position, means for coupling the last-named means with said knob to rotate said galvanometer upon rotation of said knob, means constantly urging said coupling means into operative position, and means operable manually to disconnect said coupling means to permit said last-named means to be actuated independently of said knob to change the relative positions of said galvanometer and said knob to compensate for change in speed of the photosensitive medium used in the camera.

3. In a camera having an exposure meter and a diaphragm, said exposure meter including a rotatable galvanometer and a pointer for indicating the galvanometer reading, a manually-rotatable setting knob, means connecting said knob with the diaphragm to adjust the diaphragm aperture upon rotation of said knob, means for rotating said galvanometer to bring said pointer into a predetermined position, means for coupling the last-named means with said knob to rotate said galvanometer upon rotation of said knob, resilient means constantly urging said coupling means into operative position, a member mounted on said knob but rotatable relative thereto, means carried by said member positioned upon rotation of said member relative to said knob to disengage said coupling means against the resistance of said resilient means and for thereupon actuating said last-named means independently of said knob to change the relative positions of said galvanometer and said knob to compensate for change in speed of the photosensitive medium used in the camera.

4. In a camera having an exposure meter and a diaphragm, said exposure meter including a rotatable galvanometer and a pointer for indicating the galvanometer reading, a manually-rotatable setting knob, means connecting said knob with the diaphragm to adjust the diaphragm aperture upon rotation of said knob, a first member rotatable relative to said knob, means connecting said first member to said galvanometer to rotate said galvanometer upon rotation of said first member to bring said pointer into a predetermined position, friction coupling means releasably connecting said knob to said member to rotate said first member upon rotation of said knob, a second member mounted on said knob but rotatable relative thereto, means carried by said second member positioned upon rotation of said second member relative to said knob to disengage said coupling means and for thereupon rotating said first member independently of said knob to change the relative positions of said galvanometer and said knob to compensate for change in speed of the photosensitive medium used in the camera.

5. In a camera having an exposure meter and a diaphragm, said exposure meter including a rotatable galvanometer and a pointer for indicating the galvanometer reading, a manually-rotatable setting knob, means connecting said knob to said diaphragm to adjust the diaphragm aperture upon rotation of said knob, a first member rotatable relative to said knob, means connecting said first member to said galvanometer to rotate said galvanometer upon rotation of said first member to bring said pointer into a predetermined position, a pair of rollers interposed between confronting surfaces of said knob and said first member, one of said surfaces being eccentric of the other surface, spring means for constantly urging both said rollers apart into wedging positions between said surfaces to couple said first member to said knob, whereby said first member is rotated upon rotation of said knob, a second member mounted on said knob but rotatable relative thereto, disengaging means carried by said second member positioned upon rotation of said second member relative to said knob to move said rollers toward one another against the resistance of said spring means thereby to uncouple said first member from said knob, said disengaging means being positioned thereupon to drive said first member upon continued rotation of said second member thereby to change the relative positions of said galvanometer and said knob to compensate for change in speed of the photosensitive medium used in the camera.

6. A camera as claimed in claim 5 wherein said spring means is a U-shaped spring whose free ends are disposed between said rollers, and wherein said second member drives said first member through one or other of said rollers depending upon the direction of rotation of said second member relative to said knob, and through said spring.

7. A camera as claimed in claim 5 wherein said camera has a viewfinder system including a prism, and said predetermined position is fixed by an index mark that is visible in said viewfinder system.

8. A camera as claimed in claim 5 wherein the means connecting said first member to said galvanometer includes a rotary cam that is connected to rotate upon rotation of said first member, a lever, and a follower carried by said lever and engaging said cam, and means connecting said lever to said galvanometer.

9. A camera as claimed in claim 5 wherein one of said first member and said knob is graduated for film speed ratings and the other has an index mark readable against said graduations.

References Cited in the file of this patent
UNITED STATES PATENTS

| | | |
|---|---|---|
| 2,250,898 | Tonnies | July 29, 1941 |
| 2,887,026 | Rentschler | May 19, 1959 |
| 2,902,968 | Barthruff | Sept. 8, 1959 |
| 2,933,991 | Sauer | Apr. 26, 1960 |